US012636920B2

(12) United States Patent
    Corghi

(10) Patent No.:    US 12,636,920 B2
(45) Date of Patent:        May 26, 2026

(54) APPARATUS FOR MOUNTING AND REMOVING A TYRE

(71) Applicant: Nexion S.P.A., Correggio (IT)

(72) Inventor: Giulio Corghi, Correggio (IT)

(73) Assignee: Nexion S.P.A., Correggio (IT)

( * ) Notice:      Subject to any disclaimer, the term of this patent is extended or adjusted under 35 U.S.C. 154(b) by 0 days.

(21) Appl. No.: 15/797,803

(22) Filed:      Oct. 30, 2017

(65)          Prior Publication Data

US 2018/0126807 A1      May 10, 2018

(30)        Foreign Application Priority Data

Nov. 4, 2016      (IT) ........................ 102016000111370

(51) Int. Cl.
      *B60C 25/05*          (2006.01)
      *B60C 25/132*         (2006.01)
      *B60C 25/138*         (2006.01)
(52) U.S. Cl.
      CPC ...... *B60C 25/0515* (2013.01); *B60C 25/0518* (2013.01); *B60C 25/132* (2013.01); *B60C 25/138* (2013.01); *B60C 25/0521* (2013.01)
(58) Field of Classification Search
      CPC ... B60C 25/13; B60C 25/138; B60C 25/0518; B60C 25/0593; B60C 25/132; B60C 25/0515; B60C 25/0521; B60C 25/059; B60C 25/0512
      See application file for complete search history.

(56)          References Cited

U.S. PATENT DOCUMENTS 2,201,982 A * 5/1940 Bazarek .................. G01M 1/12
                                                   157/1.22
2,545,157 A * 3/1951 McCrary ............... B60C 25/132
                                                     157/17
2,704,570 A * 3/1955 Reeves ................. B60C 25/132
                                                    157/1.2
2,783,830 A * 3/1957 Pozerycki ............. B60C 25/132
                                                     157/14

(Continued)

FOREIGN PATENT DOCUMENTS

CN        101224696        7/2008
CN        101439649 A      5/2009
          (Continued)

OTHER PUBLICATIONS

Search Report and Opinion for IT 10201600111370 dated Jul. 25, 2017.

*Primary Examiner* — Brian D Keller
*Assistant Examiner* — Marcel T Dion
(74) *Attorney, Agent, or Firm* — Dinsmore & Shohl LLP

(57)          ABSTRACT
A tyre changing machine placed on a supporting surface comprises: a wheel-holder unit rotatable about a horizontal axis of rotation; a floorplate extending along a horizontal placement surface to receive and support the wheel; a drive system for driving the wheel-holder unit along the axis of rotation; a tool-holder turret supporting a tool in a working position where it interacts with a wheel tyre; a connecting member arranged on the floorplate in a fixed position; a tool-holder arm fixable to the floorplate through the connecting member to project from the floorplate transversely to the placement surface and to hold a further tool in an operating work position where it can interact with the tyre.

14 Claims, 9 Drawing Sheets

(56) References Cited

U.S. PATENT DOCUMENTS

| | | | | |
|---|---|---|---|---|
| 3,489,198 A * | 1/1970 | Malinski | B60C 25/132 | 157/1.17 |
| 3,827,474 A * | 8/1974 | Besuden | B60C 25/132 | 157/1.28 |
| 4,047,553 A | 9/1977 | Kotila | | |
| 4,335,772 A * | 6/1982 | Bubik | B60C 25/132 | 157/1.28 |
| 5,060,708 A * | 10/1991 | Hansen | B60C 25/138 | 157/19 |
| 5,555,922 A * | 9/1996 | Brunner | B60C 25/132 | 157/1.17 |
| 6,109,327 A * | 8/2000 | Gonzaga | B60B 30/06 | 157/1.28 |
| 6,408,921 B1 * | 6/2002 | Bonacini | B60C 25/132 | 157/1.24 |
| 6,443,206 B1 * | 9/2002 | Bonacini | B60C 25/132 | 157/1.24 |
| 6,619,362 B2 | 9/2003 | Corghi | | |
| 6,880,605 B2 | 4/2005 | Corghi | | |
| 7,108,036 B2 | 9/2006 | Spaggiari | | |
| 7,343,955 B2 * | 3/2008 | Cunningham | B60C 25/135 | 157/1.22 |
| 7,438,109 B2 * | 10/2008 | Cunningham | B60C 25/138 | 157/1.24 |
| 7,621,311 B2 * | 11/2009 | Lawson | B60C 25/138 | 157/1 |
| 7,703,497 B2 | 4/2010 | Vignoli | | |
| 7,712,510 B2 | 5/2010 | Zoller | | |
| 8,051,889 B2 | 11/2011 | Ferrari et al. | | |
| 8,196,637 B1 * | 6/2012 | Story | B60C 25/0545 | 157/1.1 |
| 8,770,254 B1 * | 7/2014 | Hanneken | B60C 25/138 | 157/1.17 |
| 8,783,326 B1 | 7/2014 | Vaninger | | |
| 8,985,178 B1 | 3/2015 | Vaninger et al. | | |
| 9,434,219 B1 * | 9/2016 | Clasquin | B60C 25/0548 | |
| 9,662,946 B2 | 5/2017 | Corghi | | |
| 10,029,521 B2 | 7/2018 | Corghi | | |
| 11,220,143 B2 | 1/2022 | Corghi | | |
| 2004/0221964 A1 * | 11/2004 | Bonacini | B60C 25/138 | 157/1.28 |
| 2008/0257501 A1 * | 10/2008 | Sotgiu | B60C 25/138 | 157/1.22 |
| 2009/0101287 A1 | 4/2009 | Gonzaga | | |
| 2010/0051206 A1 * | 3/2010 | Lawson | B60C 25/0533 | 157/1.17 |
| 2011/0036507 A1 * | 2/2011 | Corghi | B60C 25/0593 | 157/1.22 |
| 2012/0279667 A1 * | 11/2012 | Carawan | B60C 25/00 | 157/14 |
| 2013/0206341 A1 * | 8/2013 | Ferrari | B60C 25/0506 | 157/1.17 |
| 2014/0034248 A1 * | 2/2014 | Gonzaga | B60C 25/0593 | 157/1.24 |
| 2014/0083625 A1 * | 3/2014 | Sotgiu | G01M 1/045 | 157/1.17 |
| 2016/0001618 A1 | 1/2016 | Corghi | | |
| 2016/0114637 A1 * | 4/2016 | Magnani | G01M 1/045 | 157/1.22 |
| 2017/0096038 A1 * | 4/2017 | Hicks | B60C 25/007 | |
| 2018/0333995 A1 * | 11/2018 | Corghi | B60C 25/0539 | |
| 2019/0291519 A1 * | 9/2019 | Polster | B60C 25/138 | |

FOREIGN PATENT DOCUMENTS

| | | |
|---|---|---|
| CN | 102555702 | 7/2012 |
| CN | 102632778 | 8/2012 |
| CN | 105270117 A | 1/2016 |
| CN | 105799433 | 7/2016 |
| CN | 108016221 A | 5/2018 |
| EP | 1479539 | 11/2004 |
| EP | 1743782 | 1/2007 |
| EP | 1946946 | 7/2008 |
| EP | 2125394 | 12/2009 |
| EP | 2282898 | 11/2011 |
| EP | 2468541 | 6/2012 |
| EP | 2484541 | 8/2012 |
| EP | 2629992 | 2/2015 |
| EP | 3323644 A1 | 5/2018 |
| ES | 2748670 T3 | 3/2020 |
| IT | 201600111370 A | 5/2018 |
| JP | 2010285059 | 12/2010 |
| WO | WO 2008081235 A1 | 7/2008 |
| WO | 2014037771 | 3/2014 |

* cited by examiner

FIG. 2c

APPARATUS FOR MOUNTING AND REMOVING A TYRE

CLAIM TO PRIORITY

This non-provisional patent application claims priority to and benefit of, under 35 U.S.C. § 119, Italian Patent Application No. 102016000111370 filed on Nov. 4, 2016 and titled "Apparatus for Mounting and Removing a Tyre", all of which is incorporated by reference herein.

TECHNICAL FIELD OF THE INVENTION

This invention relates to an apparatus for mounting and removing a tyre.

In this document, an apparatus for mounting and removing a tyre is also referred to by the term "tyre changing machine" to denote a machine configured to carry out at least part of the operations needed to remove a tyre from a rim of a vehicle wheel and/or the operations needed to mount the tyre to the rim. Such machine is configured to carry out such at least part of the operations preferably at least partly automatically.

BACKGROUND OF THE INVENTION

At present, one kind of tyre changing machine, described for example in patent document EP2282898B1 comprises a support frame which mounts two slides.

The first of these slides mounts a wheel-holder unit which the rim of a vehicle wheel, or the whole wheel—comprising the rim and the tyre mounted to the rim—can be locked to. The wheel-holder unit defines a locking axis which operatively coincides with the central axis of the rim or of the wheel when the rim of the wheel is locked in place on the wheel-holder unit.

The wheel-holder unit is configured to rotate the rim or the wheel about an axis of rotation which operatively coincides with the locking axis.

The second of these slides mounts a tool-holder turret, on which one or more tools may be fitted and which is configured to interact with the respective rim and/or with the respective tyre in order to perform, in conjunction with the wheel-holder unit, an operation on the wheel which may relate to mounting the tyre to the rim or to removing the tyre from the rim. The tool-holder turret may adopt one or more operating configurations, in each of which it directs at the wheel-holder unit a tool selected from the one or more tools in order to perform the required operation.

In each of these operating configurations, the tool-holder turret keeps the selected tool at a respective operating position in such a way that the tool can perform, in conjunction with the wheel-holder unit, a respective operation relating to mounting or removing a vehicle wheel tyre to or from a rim, respectively.

The machine comprises drive systems which operate on the slides to cause the wheel-holder unit and the tool-holder turret to be translated horizontally relative to each other in a horizontal direction parallel to the locking axis of the wheel-holder unit. Typically, this horizontal direction is at right angles to the force of gravity. These drive systems are also configured to cause the wheel-holder unit to be translated vertically relative to the tool-holder turret in a vertical direction transverse to the locking axis. Typically, this vertical direction is parallel to the force of gravity. These translational movements serve to correctly position the selected tool and the turret keeps the tool in its operating position relative to the rim which is locked on the wheel-holder unit and/or relative to the tyre which is at least partly mounted or to be mounted on the rim in order to perform the required operation with the selected tool.

The wheel-holder unit usually comprises at least one chuck, defining the locking axis, in order to lock the rim or wheel in place, and a motor drive system to set the chuck in rotation about the axis of rotation. The chuck and the motor drive system are quite cumbersome, in particular when they are configured to lock and set in rotation large rims or wheels.

Owing to the size of the wheel-holder unit and the presence of these drive systems, the wheel-holder unit must, in order to enable the selected tool to be positioned correctly relative to the rim and/or to the tyre, be kept at a certain working height from the floor, measured along the vertical direction parallel to gravity.

This may create a source of danger for the operator when the tyre comes free of the rim during tyre removal.

It should also be considered that the turret can keep the selected tool at a fixed working height which may be optimal only for wheels and/or tyres of a certain size but not for wheels and/or tyres of other sizes.

Moreover, it should be considered that the step of locking the rim or the entire wheel to the wheel-holder unit is carried out with the wheel-holder unit positioned at a height lower than the working height.

The locking step may be performed with the help of floorplates which enable the operator to bring the rim or the wheel to a height such as to allow it to be locked to the wheel-holder unit but which is in any case always a height below the working height of the wheel-holder unit when the tool is in operation.

Positioning the wheel-holder unit at the right working height requires adjustment of the height, which may take some time.

Moreover, the step of adjusting the position of the wheel-holder unit along the vertical direction must be repeated at every changeover from a specific operation carried out in the context of a wheel of one specific type to the same operation carried out in the context of another wheel of the same type. The adjustment must also be repeated when passing from removal to mounting, or vice versa, in the context of the same wheel.

Repeating the adjustment is highly time-consuming and has a negative effect on the productivity of the tyre changing machine.

Other examples of tyre fitting machines are provided in patent documents WO2014/037771A1, JP2010285059A and CN105799433.

SUMMARY OF THE INVENTION

The aim of this description is to provide a tyre changing machine that overcomes the above mentioned disadvantages of the prior art.

Another aim of this description is to provide a method for automatically carrying out at least one operation relating to the removal or mounting of a tyre respectively from and to a vehicle wheel rim to overcome the above mentioned disadvantages of the prior art.

These aims are fully achieved by a tyre changing machine and method having the features set out in any combination of one or more of the claims accompanying this application and relating to such machine and method.

According to a first aspect, this description relates to a tyre changing machine for performing at least partly automatically operations relating to mounting or removing a vehicle wheel tyre to or from a rim, respectively. The machine is adapted and/or configured to be placed on a supporting surface.

The machine comprises a bed configured and/or adapted to be placed on the supporting surface and/or to remain fixed relative to that supporting surface and on top of the supporting surface during operation of the tyre changing machine.

The bed may be operatively fixed relative to the supporting surface but only rested on the supporting surface itself.

The bed might also be operatively attached and/or coupled to the supporting surface.

The bed is thus operatively fixed on the supporting surface.

The bed comprises and/or defines a floorplate. The floorplate is preferably treadable and surmountable by a wheel and/or a tyre.

The machine comprises a wheel-holder unit. In this application, the term "wheel" may denote either only the respective rim or the entire wheel, including the rim and the tyre mounted and/or at least partly or completely mounted to the rim.

The wheel-holder unit defines a locking axis. The wheel-holder unit is configured to hold the wheel in a locked condition where the locking axis operatively coincides with a central axis of the wheel. The wheel-holder unit is configured to set the wheel, when operatively in the locked condition, in rotation about the locking axis.

In a possible embodiment, the machine includes a tool-holder turret which mounts at least one tool adapted to interact with the tyre (for example, a removal tool, a mounting tool or a bead breaker tool). Preferably, the turret is movably connected to the bed.

The machine comprises at least one tool-holder arm which mounts a further tool (for example, a removal tool, a mounting tool or a bead breaker tool). The machine is configured in such a way that the tool-holder arm can be connected or fixed, preferably in removable manner, to the bed or to the floorplate.

The machine comprises a drive system configured to cause movement of the wheel-holder unit relative to the supporting surface and/or relative to the bed and/or relative to the floorplate and/or relative to the tool-holder arm which is operatively connected to the bed or to the floorplate.

The drive system is configured in such a way that this movement can comprise at least one longitudinal translational component.

The longitudinal translational component is parallel to the locking axis or even directed along the locking axis. The longitudinal translational component is preferably operatively transverse, or even at right angles, to gravity, in which case it may be considered as a "horizontal" translational component.

The drive system is configured in such a way that this movement can comprise at least a first transverse translational component.

The first transverse translational component is transverse to the locking axis or even at right angles to the locking axis. The first transverse translational component is preferably operatively parallel to gravity, in which case it may be considered as a "vertical" translational component.

The drive system is configured in such a way that this movement can comprise at least a second transverse translational component.

The second transverse translational component is transverse to the locking axis or even at right angles to the locking axis. The second transverse translational component is preferably operatively transverse, or even at right angles, to gravity, in which case it may be considered as a "lateral" translational component.

The drive system is configured to generate a movement of the wheel-holder unit comprising only one of the aforementioned translational components or a movement resulting from a simultaneous combination of one or more of these translational components. For example, the movement system may cause the wheel-holder unit to perform a movement which simultaneously comprises the first transverse component and the second transverse component.

The tool-holder arm is configured to hold the further tool in a position of mounting the further tool on the arm. This mounting position corresponds to an operating work position of the further tool where the same further tool, in conjunction with the wheel-holder unit, can perform at least one of the operations relating to the mounting or removal of the wheel tyre to and from the rim, respectively.

The tool-holder arm is configured in such a way that when the further tool is held in its operating position by such arm, such further tool is also fixed or locked to the tool-holder arm itself.

The bed is configured to keep the arm in a position of fixing the arm on the bed itself when the arm is connected to the bed or to the floorplate. This fixing position operatively corresponds to the operating position of the further tool. That means that when the arm is in the fixing position on the bed and the further tool is in the mounting position on the arm, the further tool is in the operating work position and is kept fixed in that operating work position relative to the bed and by means of the arm which is in turn fixed to the bed.

It should be considered that the further tool may also be built directly into the arm, and thus be a part thereof, in which case it is in that mounting position.

The tool-holder arm preferably has a first and a second end. The first end is operatively connected to the further tool; the other end is operatively connected directly to the bed or to the bed floorplate.

The machine may comprise a plurality of tool-holder arms and a plurality of further tools (for example, removal tools, mounting tools or bead breaker tools). Each respective arm is configured to mount a respective further tool.

The machine is configured in such a way that each respective arm can be connected or fixed, preferably in removable manner, to the bed or to the floorplate.

Each respective tool-holder arm is configured to mount the respective further tool and to hold it in a respective position of mounting the respective further tool on the respective arm. This mounting position corresponds to an operating work position of the respective further tool where the same respective further tool, in conjunction with the wheel-holder unit, can perform at least one of the operations relating to the mounting or removal of the wheel tyre to and from the rim, respectively.

In an example embodiment of the machine, the bed is configured to keep the respective arms in respective positions of fixing the respective arms on the bed itself when such arms are connected to the bed or to the floorplate. These fixing positions operatively correspond to the respective operating positions of the respective further tools. That way, when the respective arms are in the respective fixing positions on the bed and the respective further tools are in the respective mounting positions on the respective arms, the respective further tools are in such respective operating positions and are kept fixed in such respective operating positions relative to the bed and by means of the respective arms which are in turn fixed to the bed.

It should in any case be considered that each respective further tool may also be built directly into the respective arm, and thus be a part thereof, in which case it may be said that it is always in that respective mounting position.

According to a second aspect, this description relates to a method for performing at least one operation relating to mounting or removing a vehicle wheel tyre to or from a respective wheel rim, respectively.

The method comprises a step of locking at least one wheel on a wheel-holder unit in such a way that a central axis of the wheel coincides with a locking axis defined by the wheel-holder unit.

The method comprises a step of placing a bed on a supporting surface. This placement step is such that after it is performed, the bed remains fixed relative to the supporting surface. The placement step may comprise even only resting the bed on the supporting surface and/or it may comprise attaching the bed to the supporting surface.

The method comprises a step of fixing a tool-holder arm fitted with a further tool in a position of fixing the arm on the bed. This step of fixing the tool-holder arm on the bed is carried out in such a way that the further tool adopts an operating work position to perform the at least one operation in conjunction with the wheel-holder unit.

The method comprises a step of driving the wheel-holder unit relative to the supporting surface. This driving step may be carried out by generating at least one component of horizontal translational movement in a horizontal direction parallel to the locking axis. This driving step may be carried out by generating at least one component of vertical translational movement in a vertical direction transverse to the locking axis.

The method comprises a step of performing the at least one operation by joint action between the (further) tool in the operating position and the wheel-holder unit.

In an example embodiment of the method, the fixing step includes fixing a plurality of tool-holder arms fitted with respective further tools in respective fixing positions on the bed. This step of fixing the tool-holder arms is carried out in such a way that the further tools adopt respective operating positions to perform, in conjunction with the wheel-holder unit, respective operations relating to the mounting or removal of the vehicle wheel tyre respectively to and from the respective wheel rim.

In an example embodiment of the method, the performance step comprises performing the respective operations by joint action between the respective further tools and the wheel-holder unit.

BRIEF DESCRIPTION OF THE DRAWINGS

These features of the disclosure will become more apparent from the following description of preferred embodiments of the machine and method according to this description, illustrated by way of non-limiting example in the accompanying drawings, in which:

Figure 2C:
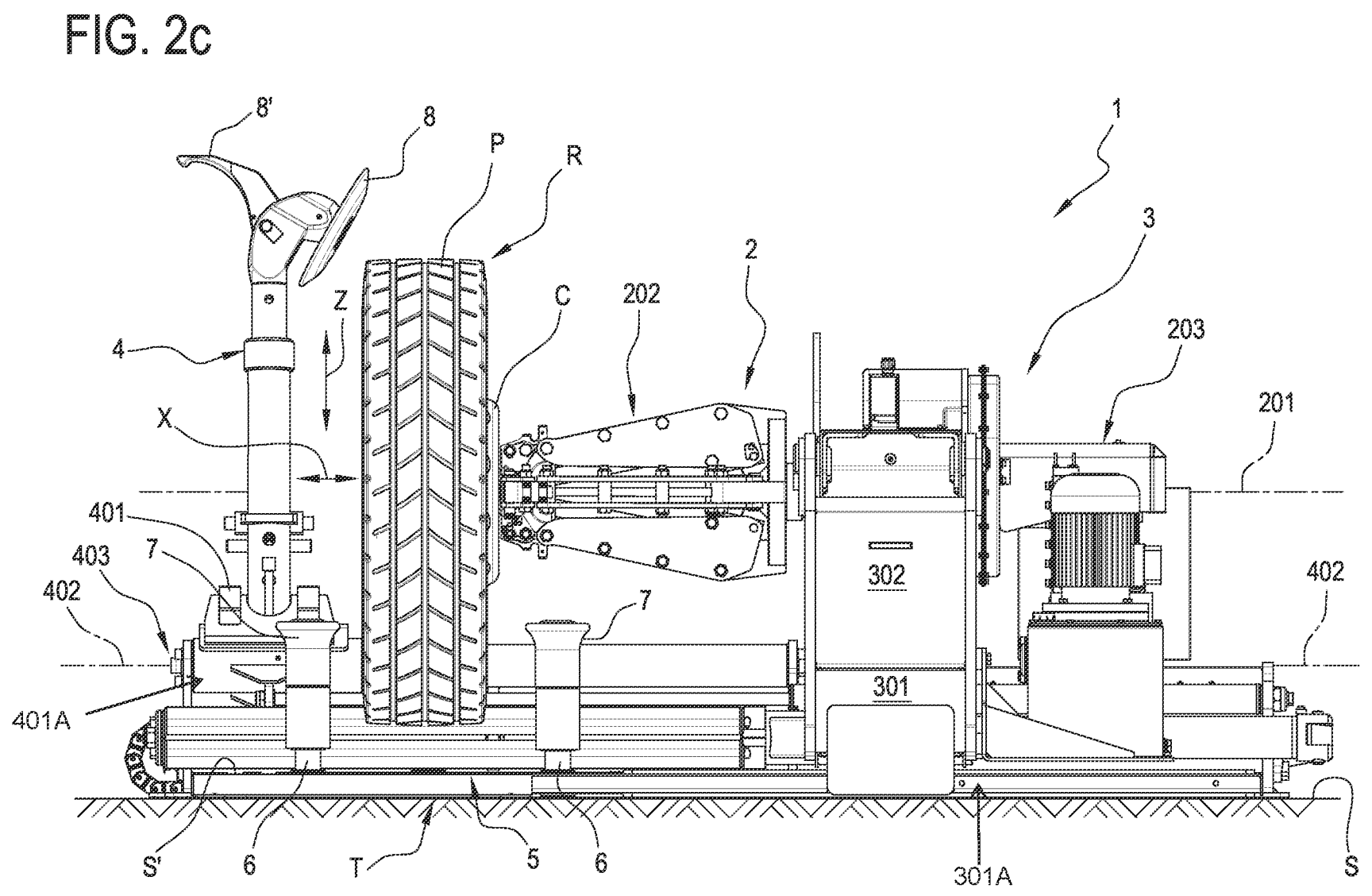

FIGS. 2a-2f are respective views of the same possible embodiment in a second operating configuration;

DESCRIPTION OF THE PREFERRED EMBODIMENTS

Figure 1:
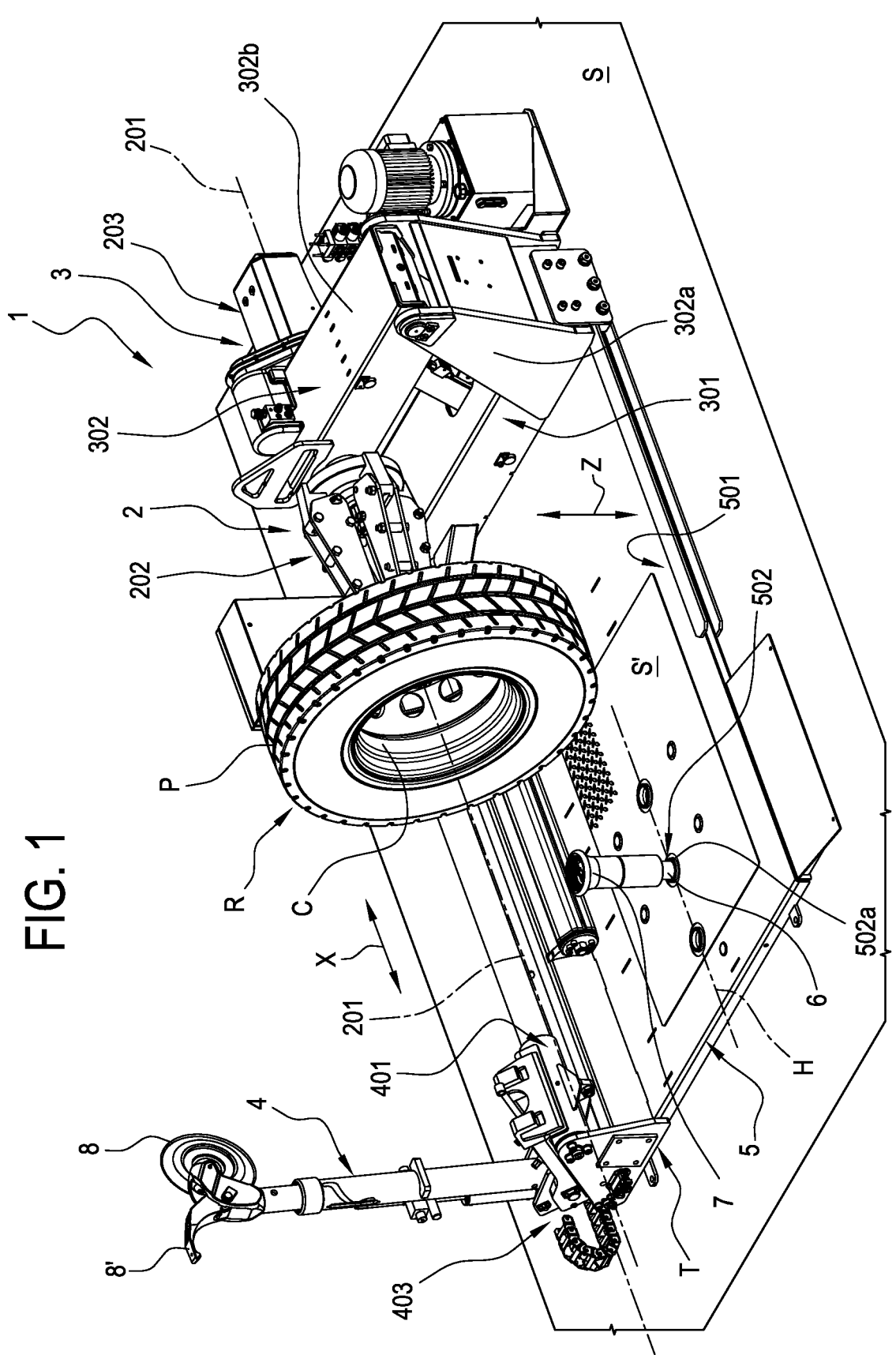
FIG. 1 is a perspective view of a possible embodiment of a machine according to this description in a first operating configuration.
Figure 2A:
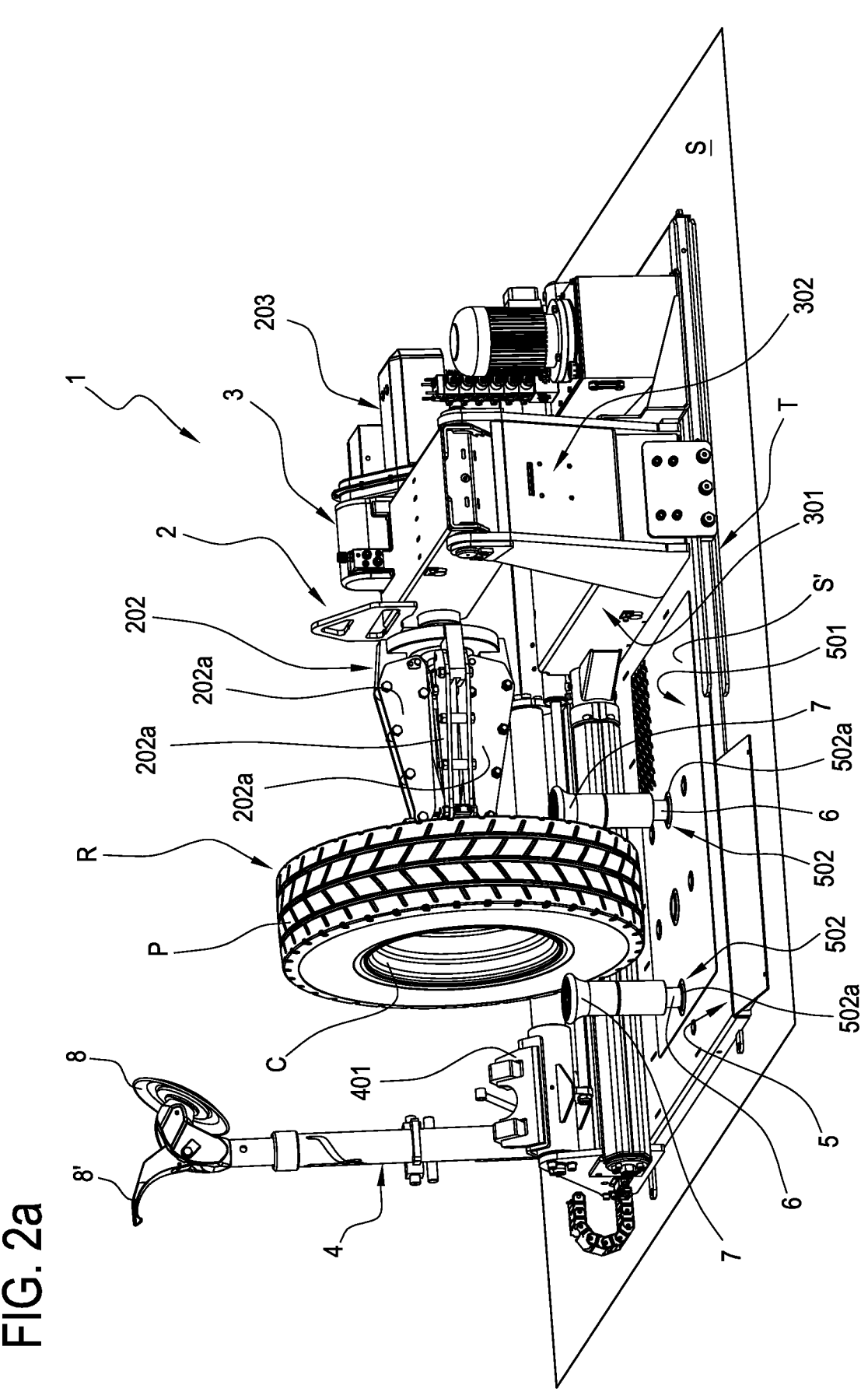
Figure 2B:
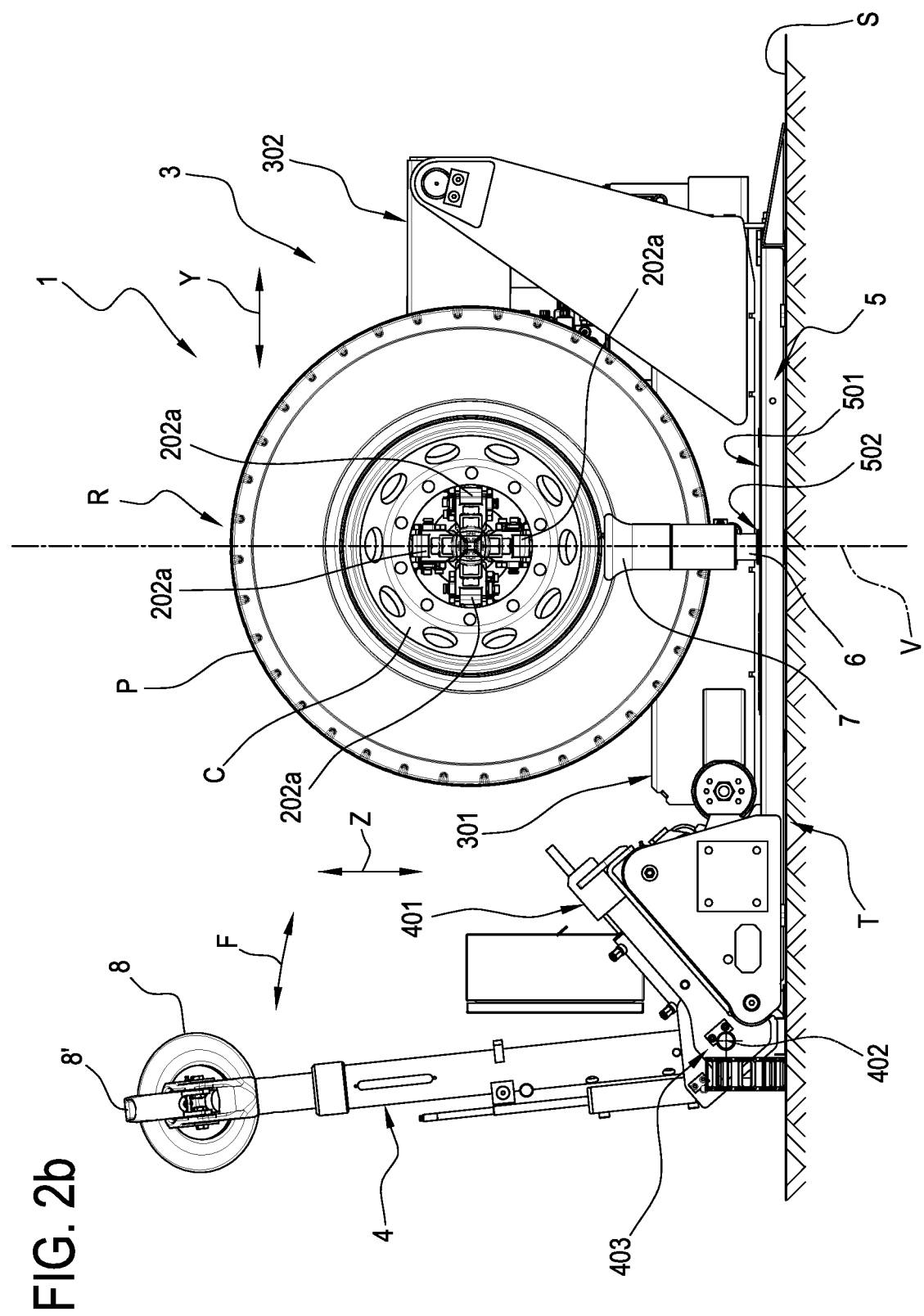
Figure 2D:
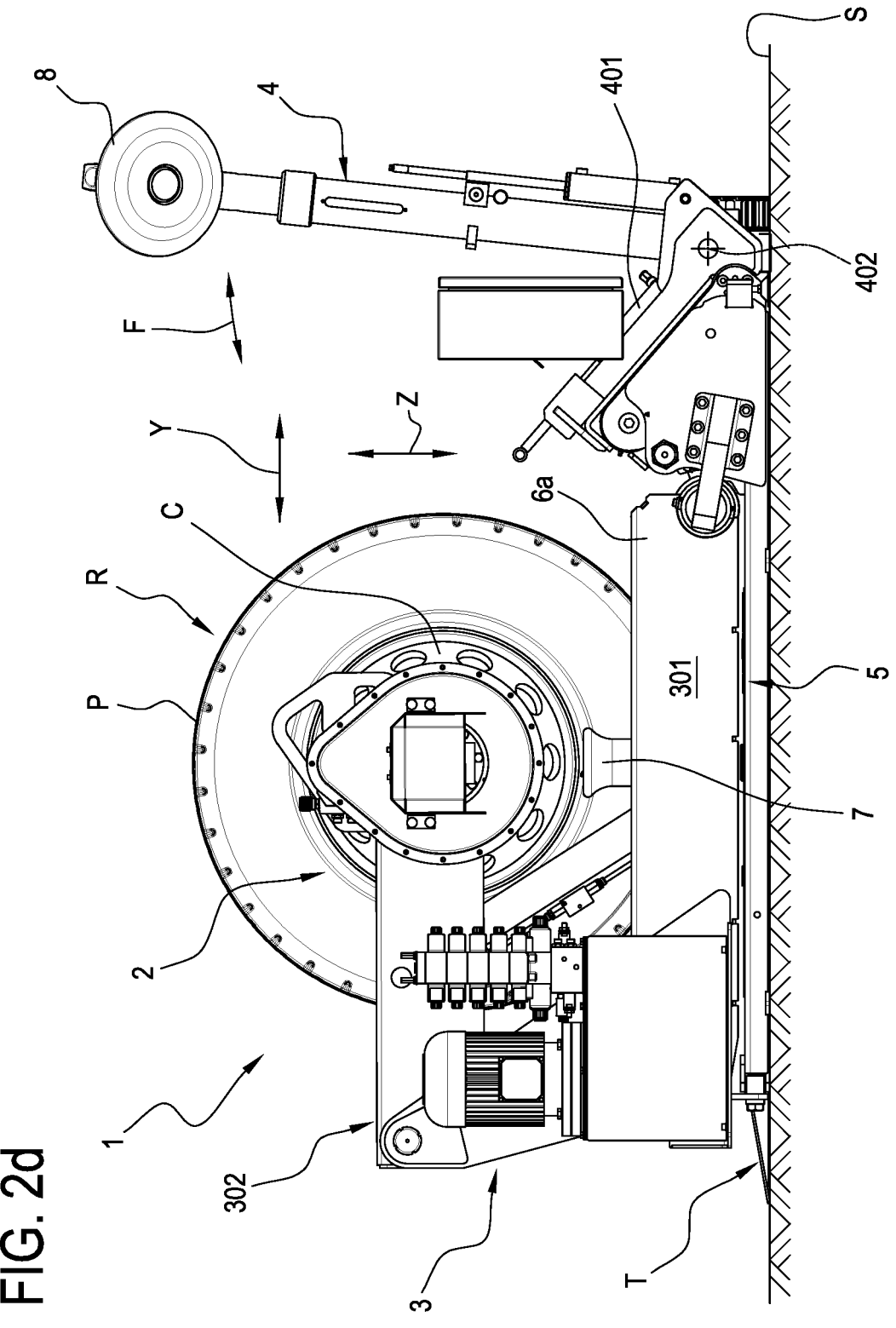
Figure 2E:
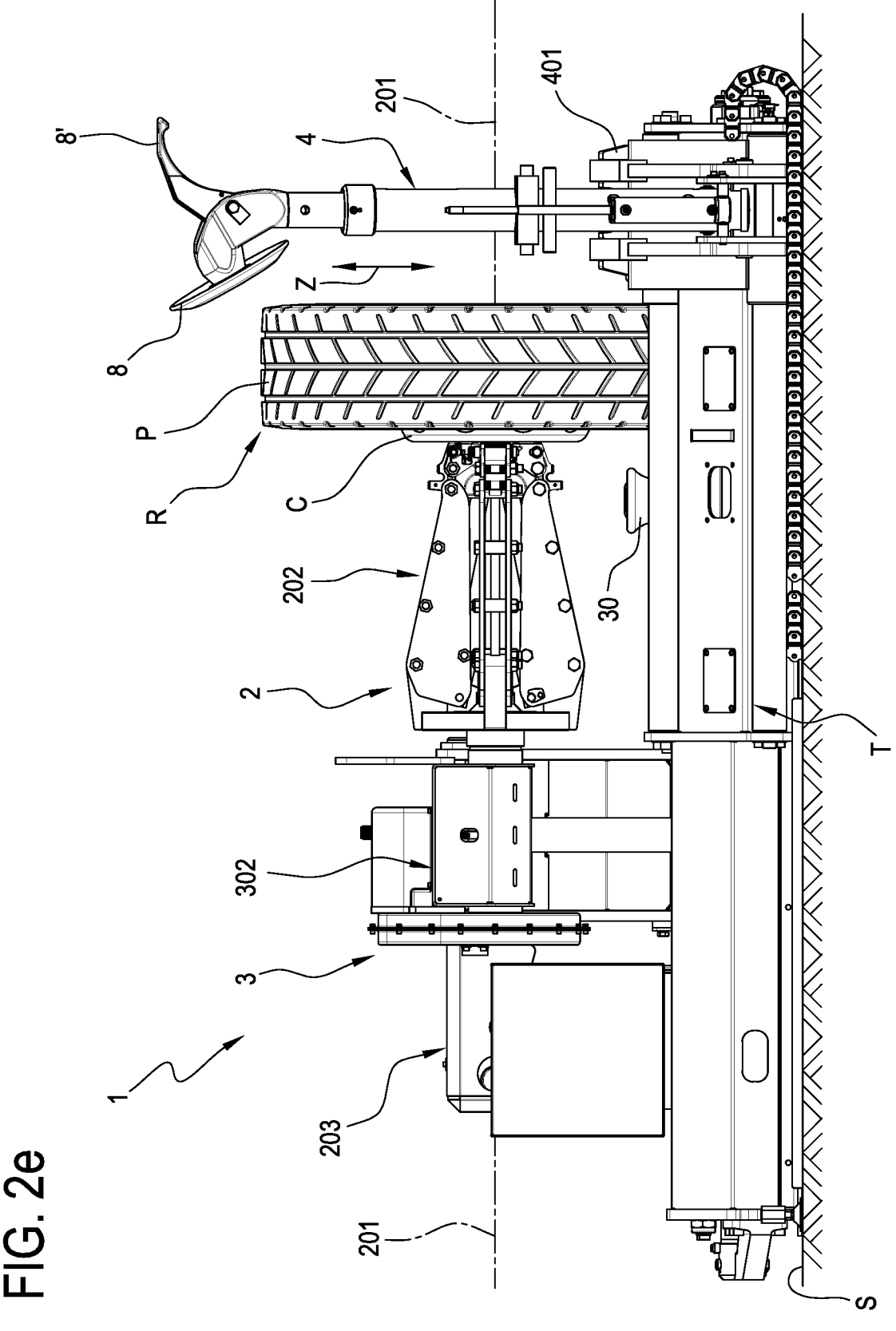
Figure 2F:
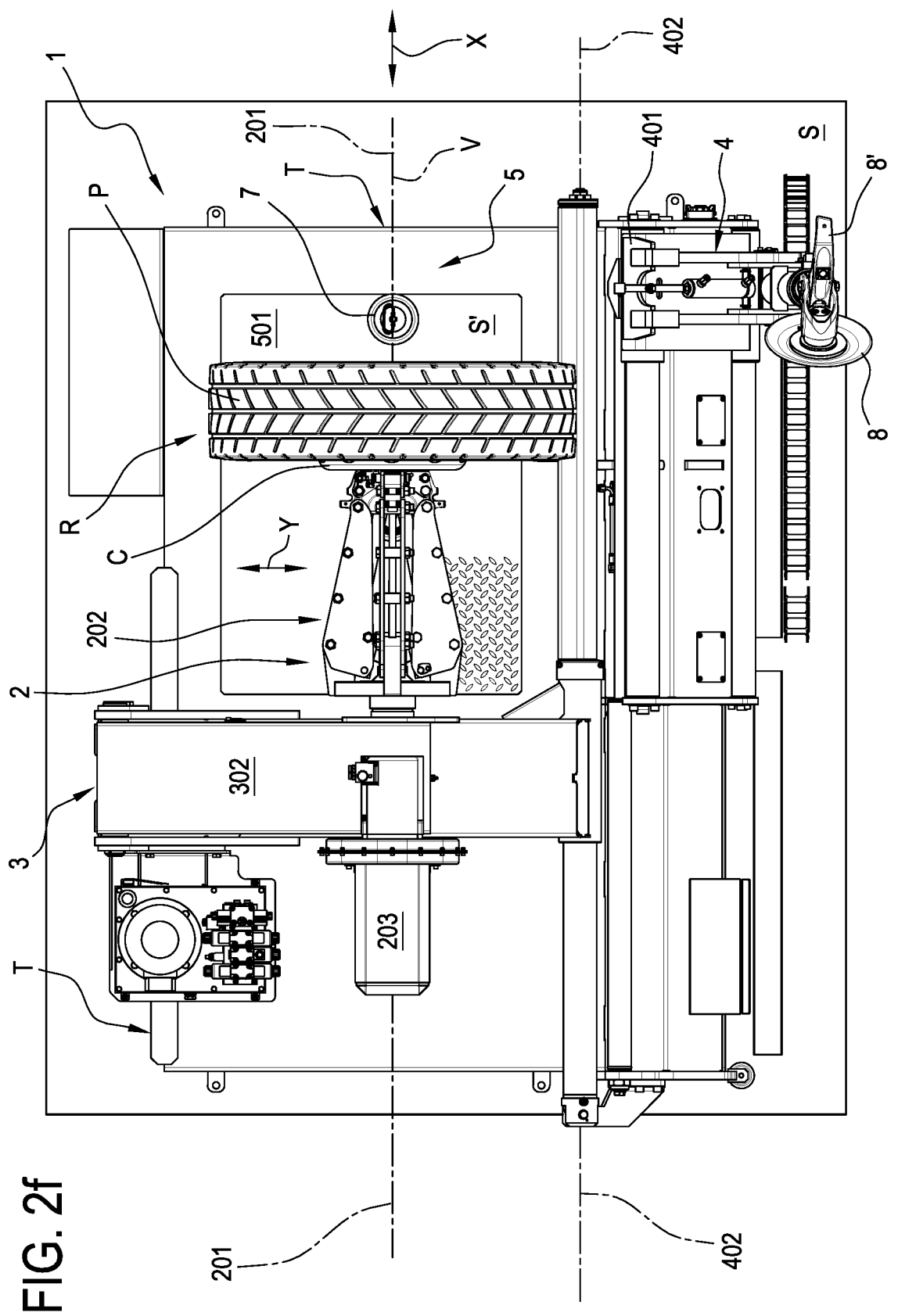

The accompanying drawings show a tyre changing machine 1 according to a possible embodiment of this description. In the operating configurations of it illustrated in the accompanying drawings, the tyre changing machine 1 is operatively rested on a supporting surface S.

The machine comprises a wheel-holder unit 2. In this application, the term "wheel" may denote either only the respective rim C or the entire wheel R, including the rim C and the tyre P mounted and/or at least partly or completely mounted to the rim C.

The wheel-holder unit 2 defines a locking axis. The wheel-holder unit 2 is configured to hold the wheel R in a locked condition where the locking axis operatively coincides with a central axis of the wheel R. The wheel-holder unit 2 is configured to set the wheel R, when operatively in the locked condition, in rotation about an axis of rotation 201.

In the embodiments shown in the accompanying drawings, the axis of rotation 201 coincides with the locking axis. In the operating configurations of the machine 1 shown in the accompanying drawings, the axis of rotation 201 is operatively transverse, or at right angles, to gravity. In these operating configurations of the machine 1, the axis of rotation 201 is parallel to the supporting surface S.

The wheel-holder unit 2 comprises a self-centring device 202. The self-centring device 202 comprises a plurality of jaws 202a for clamping the rim C and hence the wheel R.

The wheel-holder unit 2 comprises a motor drive system 203 to set the self-centring device 202 in rotation about the axis of rotation 201, so the self-centring device 202 moves the wheel R and/or the rim C along with it in rotation about the axis of rotation 201. The axis of rotation 201 operatively coincides with the axis of the wheel R or of the rim C.

The machine 1 comprises a frame T adapted to be rested on the supporting surface S in such a way as to remain preferably fixed relative to the supporting surface S.

The machine comprises a bed 5 configured and/or adapted to be rested on the supporting surface S. The bed 5 is configured to remain fixed relative to that supporting surface S and on top of the supporting surface S during operation of the machine 1.

The bed 5 may be operatively fixed relative to the supporting surface but only rested on the supporting surface S itself.

The bed 5 might also be operatively attached and/or coupled to the supporting surface S.

The bed 5 is thus operatively fixed on the supporting surface S.

The bed comprises and/or defines a floorplate 501. The floorplate is preferably treadable and surmountable by a wheel R and/or a tyre P.

The floorplate 501 extends along a placement surface S' of the floorplate 501 itself.

In an example embodiment of the machine 1, the placement surface S' is parallel to the axis of rotation 201. The floorplate 501 is configured to receive and support on it the wheel R complete with rim C and tyre P or the tyre P after it has been removed from the rim C. The floorplate 501 is treadable.

In the operating configurations of the machine 1 shown in the accompanying drawings, the placement surface S' of the floorplate 501 is parallel to the supporting surface S.

The bed 5, and thus also the floorplate 501, are preferably operatively fixed relative to the frame T of the machine 1 and/or form part of the frame T.

The axis of rotation 201 is oriented along a longitudinal direction. The longitudinal direction is preferably parallel to the floorplate 501.

The machine comprises a drive system 3 configured to move the wheel-holder unit 2.

The drive system 3 is configured to move the wheel-holder unit 2 along a trajectory having at least one longitudinal translational component (indicated by the double arrow X in the non-limiting example illustrated).

In one embodiment, the longitudinal translational component is operatively parallel to the axis of rotation 201. In one embodiment, the longitudinal translational component is transverse, or at right angles, to gravity and may be considered as a "horizontal" translational component (in the sense that the longitudinal direction is oriented horizontally relative to the weight force); the transverse direction is perpendicular, or substantially perpendicular, to the longitudinal direction.

In one embodiment, the drive system 3 is configured to move the wheel-holder unit 2 along a trajectory having at least a first transverse translational component (indicated by the double arrow Z in the non-limiting example illustrated).

The first transverse translational component is transverse to the axis of rotation 201. In one embodiment, the first transverse translational component is at right angles to the axis of rotation 201. In one embodiment, the first transverse translational component is parallel to gravity, in which case it may be considered as a "vertical" translational component.

In one embodiment, the drive system 3 is configured to move the wheel-holder unit 2 along a trajectory having at least a second transverse translational component (indicated by the double arrow Y in the non-limiting example illustrated).

The second transverse translational component is transverse to the axis of rotation 201. In one embodiment, the second transverse translational component is at right angles to the axis of rotation 201. In one embodiment, the second transverse translational component is operatively transverse, or at right angles, to gravity, in which case it may be considered as a "lateral" translational component.

In one embodiment, the drive system 3 is configured to move the wheel-holder unit 2 along (any one or) each of the aforementioned translational components; in one embodiment, the drive system 3 is configured to move the wheel-holder unit 2 along any combination of the aforementioned translational components. For example, the drive system 3 may cause the wheel-holder unit 2 to perform a movement which simultaneously comprises the first transverse component and the second transverse component.

In an example embodiment of the machine 1, the drive system 3 is also configured to cause the wheel-holder unit 2 to perform at least one longitudinal movement relative to the bed 5 and/or to the supporting surface S and/or to the floorplate 501. This longitudinal movement is performed along the axis of rotation 201 and comprises the longitudinal translational component.

This longitudinal movement may be, for example, along the direction indicated by the double arrow X.

The drive system 3 comprises a first slide 301 which the wheel-holder unit 2 is connected to or mounted on.

The machine 1 may comprise a first actuator 301A (for example, hydraulic), to move the first slide 301 translationally parallel to the axis of rotation 201. The translational movement of the first slide 301 parallel to the axis of rotation 201 in turn produces a translational movement of the wheel-holder unit 2 along the axis of rotation 201.

In an example embodiment of the machine 1, the drive system 3 is also configured to cause the wheel-holder unit 2 to perform at least one transverse movement relative to the bed 5 and/or to the supporting surface S and/or to the floorplate 501. This transverse movement is performed transversely or at right angles to the axis of rotation 201 and may comprise at least one of the aforementioned transverse translational components.

This transverse movement may be, for example, along the direction indicated by the double arrow Y or by the double arrow Z.

In the operating configuration shown in the accompanying drawings, the double arrow Y indicates a translational movement at right angles to the axis of rotation 201 and to gravity, and the double arrow Z a translational movement at right angles to the axis of rotation 201 and parallel to gravity.

In the operating configuration shown in the accompanying drawings, the drive system can generate a movement in which the translations in the directions indicated by the arrows Z and Y are performed simultaneously, producing, for example, a curved or even circular movement.

The drive system 3 comprises an articulated arm 302 to impart to the wheel-holder unit 2 a movement comprising at least one of the aforementioned transverse translational components.

The wheel-holder unit 2 is connected to, or mounted on, the articulated arm 302.

In an example embodiment of the machine 1, the articulated arm 302 is in turn operatively interposed between the wheel-holder unit 2 and the first slide 301. The wheel-holder unit 2 is thus connected to, or mounted on, the first slide 301 by interposition of the articulated arm 302.

The machine 1 comprises an actuator or a motor, not illustrated, to generate a movement of the articulated arm 302. This movement of the articulated arm 302 in turn causes the wheel-holder unit 2 to move transversely or at right angles to the axis of rotation 201, for example along the directions indicated by the double arrow Z or by the double arrow Y, or along the combination of the directions indicated by arrows Z and Y.

The articulated arm may comprise a first portion 302a, which is preferably fixed relative to the first slide 301, and a second, movable portion 302b to generate this movement of the wheel-holder unit 2 transverse to the axis of rotation 201. The second, movable portion 302b may, for example, rotate relative to the first portion 302a to generate this movement transverse to the axis of rotation 201 of the wheel-holder unit 2.

In an example embodiment of the machine 1, the drive system 3 is configured to move the wheel-holder unit 2 transversely or at right angles to the axis of rotation 201 and towards/away from the floorplate 501, for example as indicated by the double arrow Z.

The machine 1 comprises a tool-holder turret 4.

Figure 4:
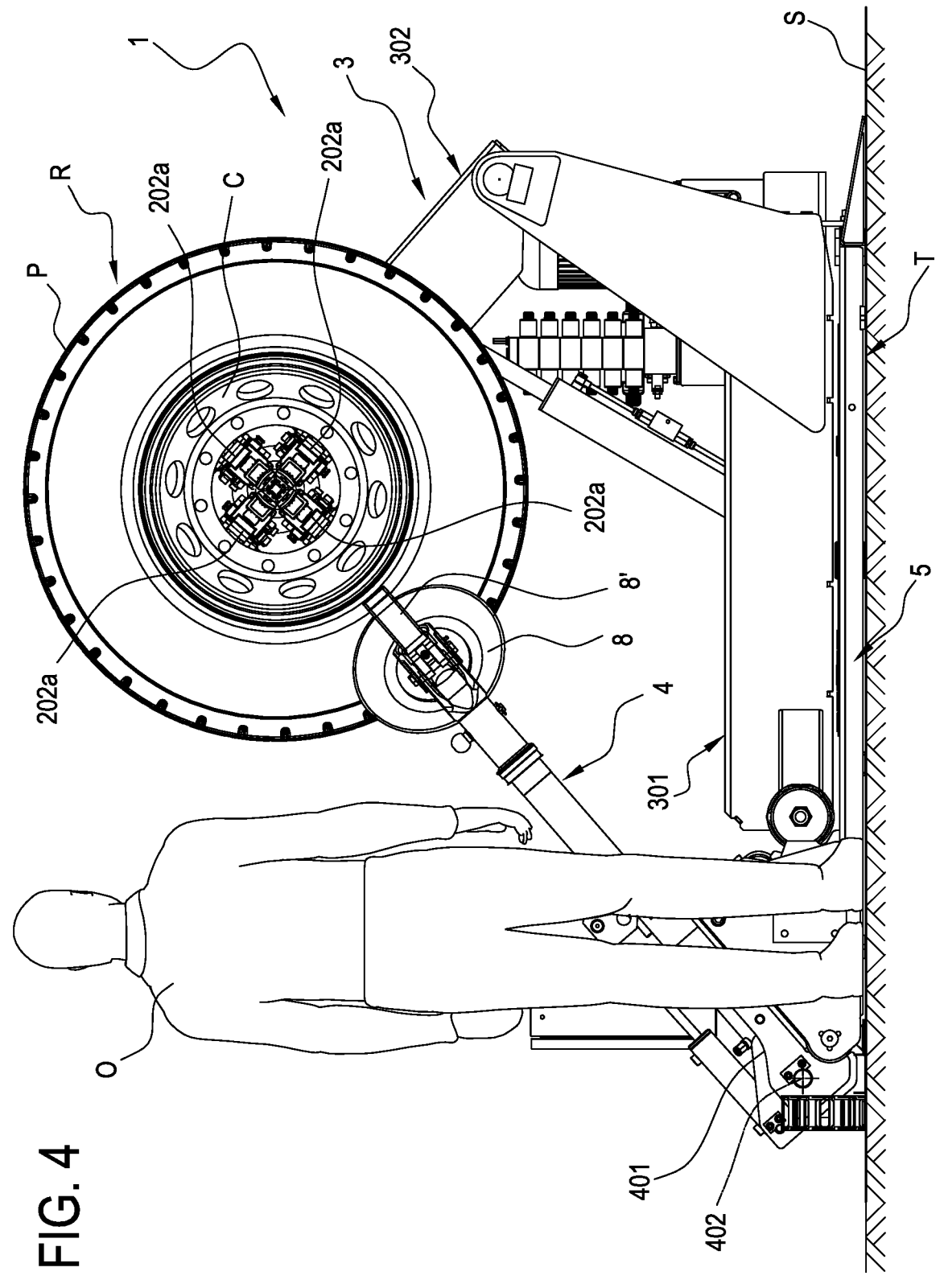
FIG. 4 is a perspective view of the same possible embodiment in a fourth operating configuration, showing by way of example a possible wheel size on which the same embodiment can operate.

The turret 4 may adopt a non-operating (that is, rest) condition, shown in all the drawings except FIG. 4, and an operating (that is, working) condition, shown in FIG. 4.

The machine also comprises at least one tool adapted to interact with the wheel tyre in order to perform mounting, removal or bead breaking operations on the tyre relative to the rim.

The at least one tool is mounted on the turret 4, which is configured to support the at least one tool in at least one operating position.

In one embodiment, the machine comprises at least one bead breaker tool 8; in one embodiment, the machine comprises at least one mounting or removal tool 8'.

In one embodiment, the machine comprises at least the bead breaker tool 8 and the mounting and/or removal tool 8'.

In such case, both the bead breaker tool 8 and the mounting and/or removal tool 8' are mounted on the turret 4.

The turret 4 is configured to move the at least one tool 8, 8' between a working position, where it operates on the tyre, and a rest position, where the tool is clear of the tyre.

In the operating work position, the at least one tool 8 or 8' is adapted to perform, in conjunction with the wheel-holder unit 2, at least one operation relating to the mounting or removal of the tyre P to or from the rim C.

In one embodiment, the tool-holder turret 4 is movable along the longitudinal direction; in one embodiment, the tool-holder turret 4 is also movable to move the at least one tool 8 or 8' transversely to the longitudinal direction and towards and away from the tyre (for example, radially).

In one embodiment, the turret 4 can move the tools 8 and 8' about an axis along which the turret 4 itself extends.

The turret 4 is movably connected to, or mounted on, the bed 5.

In an example embodiment, the machine 1 may comprise a rotation system 403 to cause a rotation of the turret 4.

In the embodiment shown in the accompanying drawings, the turret 4 is movable between the non-operating condition and the operating condition by means of the rotation system 403.

The rotation system 403 for example comprises a hinge defining an axis of rotation and an actuator configured to rotate the turret 4 about the hinge.

In an example embodiment, the machine comprises a second slide 401. The turret 4 is mounted on, or connected to, the second slide 401.

In an example embodiment of the machine 1, the second slide 401 is in turn operatively interposed between the turret 4 and the bed 5.

The machine 1 may comprise a second actuator 401A (for example, hydraulic), to move the second slide 401 translationally parallel to or along an axis of translation 402. The translational movement of the second slide 401 parallel to or along the axis of translation 402 in turn produces a translational movement of the turret 4 along the axis of translation 402.

The axis of rotation about which the turret 4 is movable between its non-operating condition and its operating condition may be parallel to, or coincident with, the axis of translation 402. In the non-limiting example illustrated, this rotation is indicated by the arrow F.

The rotation system 403 is preferably integral with the translation of the second slide 401 along the axis of translation 402.

The turret 4 is thus connected to (or mounted on) the bed 5 by interposition of the second slide 401 and/or of the rotation system 403.

The machine 1 comprises at least one tool-holder arm 6. The tool-holder arm 6 is configured to mount (at least) one further tool 7 (for example, a removal tool, a mounting tool or a bead breaker tool).

In one embodiment, the tool-holder arm 6 and the further tool 7 are operatively coupled (with the further tool 7 in a mounting position) rigidly in such a way as to form a rigid unit.

It should be noted that the expression "further tool" is used in this document to distinguish the tool 7 mounted on the tool-holder arm 6 from the at least one tool 8 mounted on the turret 4.

The tool-holder arm 6 can be anchored (fixed) directly to the floorplate 501. The tool-holder arm 6 can be removably anchored (fixed) directly to the floorplate 501.

In one embodiment, the tool-holder arm 6 and the corresponding further tool 7 are irremovably attached to each other to form a single part; in another embodiment, the tool-holder arm 6 and the corresponding further tool 7 are detachable from each other.

In one embodiment, the tool-holder arm 6 is a rigid member; preferably, the tool-holder arm 6 is a rod-shaped member.

In one embodiment, the machine 1 comprises a plurality (two or more) tool-holder arms 6; the numeral 6' in the accompanying drawings denotes a tool-holder arm provided in addition to the tool-holder arm 6. The machine might also comprise a corresponding plurality of further tools 7, each coupled to a corresponding tool-holder arm 6; the numeral 7' in the drawings denotes a further tool additional to the further tool 7.

The machine 1 comprises at least one connecting member 502 situated on the floorplate 501 and configured to allow the tool-holder arm 6 to be connected (that is, fixed or anchored) to the floorplate 501. The connecting member 502 is situated on the floorplate 501 at a fixed position relative to the floorplate 501 (that is, relative to the bed 5) and thus stationary relative to a movement of the wheel-holder unit 2 (and relative to a movement of the turret 4).

The at least one further tool 7 is thus fixable to the floorplate 501 by means of the tool-holder arm 6 and the at least one connecting member 502, so as to be rigidly connected to the floorplate 501 at a predetermined position defined by the position of the connecting member 502.

Operatively, the at least one further tool 7, fixed directly and rigidly to the floorplate 501 by means of the tool-holder arm 6 and the connecting member 502, acts jointly with the wheel-holder unit 2 to interact with the tyre to perform at least one of the operations relating to mounting or removing the tyre P (bead breaking, mounting or removal).

In one embodiment, the tool-holder arm 6 or 6' has a first and a second end. The first end is operatively connected to the further tool 7 or 7'; the other end is operatively connected directly to the floorplate 501 of the bed 5.

It should be noted that the at least one connecting member 502 is configured to be coupled to the tool-holder arm 6 positioned transversely to the floorplate 501, in such a way that the tool-holder arm 6 projects from the floorplate 501 at right angles to the bed 5, that is, to the placement surface S' (and also to the floorplate 501 itself).

In one embodiment, the connecting member 502 is disposed along an axis of placement H in a vertical plane. The axis of placement H is preferably parallel to the placement surface S' of the floorplate 501 or to the floorplate 501.

The vertical plane is a plane parallel to the axis of rotation 201 and transverse or at right angles to the placement surface S' of the floorplate 501 or to the floorplate 501.

The vertical plane may (but not necessarily must) contain the axis of rotation 201.

The trace of the vertical plane is labelled "V" in the drawings. In an example embodiment, the axis of placement H is defined by the intersection of this vertical plane with the floorplate 501 or the placement surface S' thereof.

In an example embodiment of the machine 1, the axis of translation 402 of the turret 4 is situated laterally and externally of this vertical plane.

In an example embodiment of the machine 1, the connecting member 502 comprises a hole 502*a*. The hole 502*a* is made in the floorplate 501 and is adapted to receive the tool-holder arm 6 in a direction transverse or at right angles to the floorplate 501 or to the placement surface S' of the floorplate 501.

The machine 1 may comprise a coupling structure, for coupling or attaching or fixing the tool-holder arm 6 or 6' to or in the hole 502*a*. This coupling structure, may be integral with the hole 502*a* or with the tool-holder arm 6 or 6'.

The machine 1 might also comprise a reinforcing structure configured to reinforce the tool-holder arm 6 in order to better release the forces generated when the further tool 7 acts jointly with the wheel-holder unit 2 to remove or mount the tyre P. More specifically, during the joint action between the further tool 7 and the wheel-holder unit 2, the wheel-holder unit 2 might be driven by the first slide 301 and/or by the articulated arm 302, thereby increasing the intensity of the forces acting on the tool-holder arm 6.

The further tool 7 may be, for example, a bead breaker tool or a tyre changing tool. The further tyre changing tool comprises a claw-like or hook-shaped lever. This lever is adapted to engage the bead of the tyre P.

In a possible embodiment of the machine 1, the machine 1 comprises a plurality of tool-holder arms 6, which may also be more than two.

The machine 1 may comprise a plurality of further tools 7 (for example, removal tools, mounting tools or bead breaker tools).

The machine 1 is configured in such a way that each respective tool-holder arm 6 can be connected or fixed, preferably in removable manner, to the floorplate 501.

In a possible embodiment, the machine 1 comprises a plurality of connecting members 502 situated on the floorplate. These connecting members 502 are situated on the floorplate 501 at respective predetermined or fixed positions relative to the floorplate 501 itself (unlike the wheel-holder unit 2 and the turret 4, which are movable relative to the floorplate 501).

This allows simultaneously fixing a plurality of further tools 7 to the floorplate 501 by means of a corresponding plurality of tool-holder arms 6 and/or allows fixing one further tool 7 by means of a corresponding tool-holder arm 6 in a plurality of different positions defined on the floorplate 501.

Each respective tool-holder arm 6, when it is operatively fixed to the floorplate 501 by means of a respective connecting member 502, projects from the floorplate 501 transversely or at right angles to the bed 5 or to the placement surface S' or to the floorplate 501.

In a possible embodiment of the machine 1, these connecting members 502 are disposed and distributed along the axis of placement H (that is to say, they are intersected by the vertical plane V). In a possible embodiment of the machine 1, these connecting members 502 are longitudinally spaced (preferably along the axis of placement H).

Each of these connecting members 502 may comprise a respective hole 502*a*.

For each connecting member 502, the machine 1 may comprise a coupling structure for coupling or attaching or fixing the respective tool-holder arm 6 or 6' to or in the respective hole 502*a*.

This coupling structure may be integral with the respective hole 502*a* or with the respective tool-holder arm 6 or 6'.

In the first operating configuration of the machine 1 shown in FIG. 1, there is only one tool-holder arm 6, which is fitted with a further bead breaker tool 7. The tool-holder arm 6 of FIG. 1 is fixed to the floorplate 501 by means of the connecting member 502.

In the second operating configuration of the machine 1 shown in FIGS. 2*a*-2*f*, there are two tool-holder arms, both labelled 6, each fitted with a bead breaker tool 7. The tool-holder arms 6 of FIGS. 2*a*-2*f* are fixed to the floorplate 501 by means of respective connecting members 502.

Figure 3:
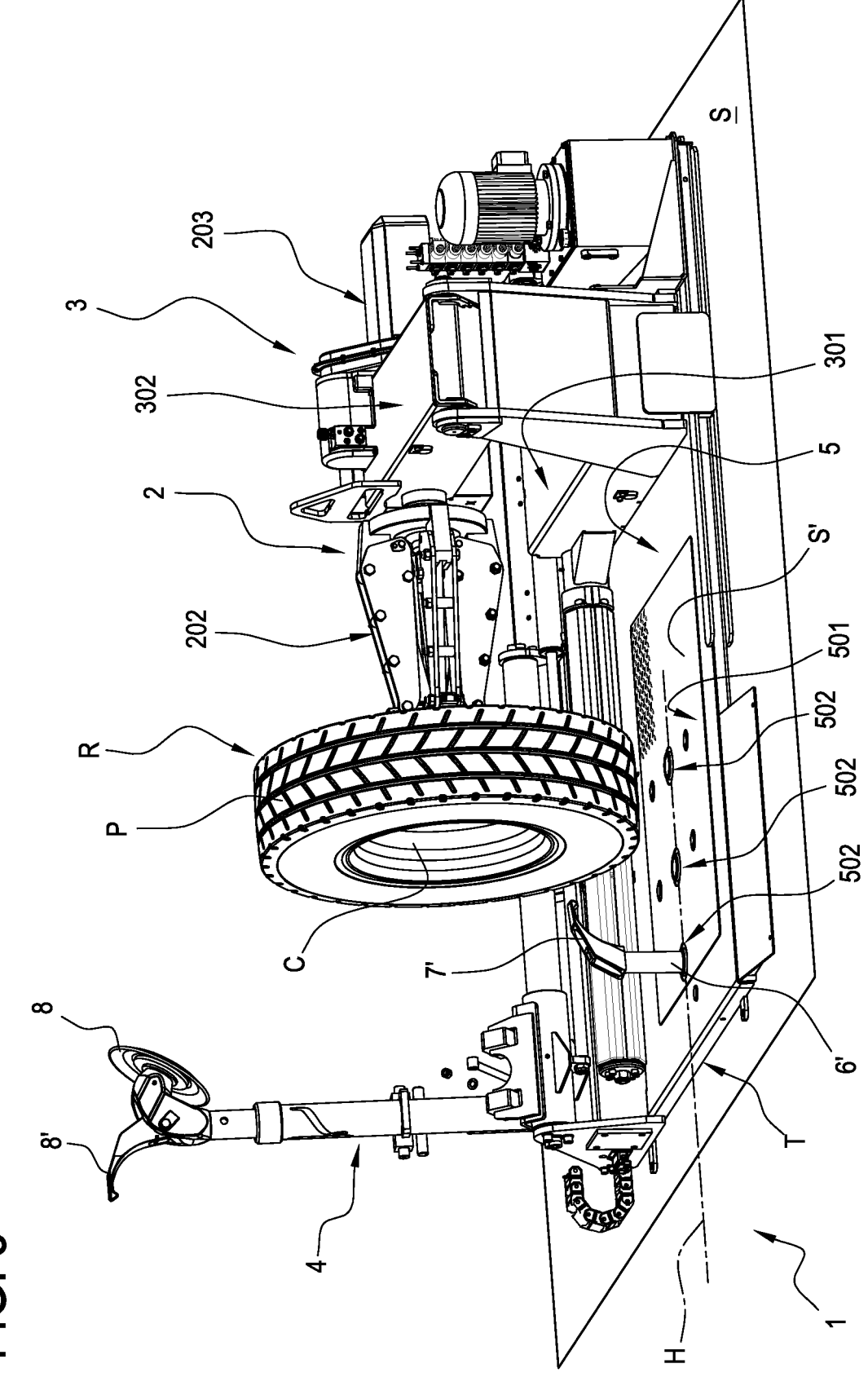
FIG. 3 is a perspective view of the same possible embodiment in a third operating configuration.

In the third operating configuration of the machine 1 shown in FIG. 3, there is another tool-holder arm, labelled 6', which is fitted with a further tyre changing tool 7'. The tool-holder arm 6' is fixed to the floorplate 501 by means of the connecting member 502 of FIG. 3.

In the example floorplate 501 shown in the accompanying drawings, the floorplate mounts three connecting members 502 but there may be a different number of connecting members because the machine 1 according to this description is configured to operate with any number of tool-holder arms fitted with respective further tools and fixed to the floorplate by means of a corresponding number of respective connecting members. Each of these respective further tools may be of any type.

This description also provides a method for using the tyre changing machine 1.

The method comprises a step of moving a wheel R or a rim C onto the floorplate 501. In an example embodiment, this step is carried out by the tyre mechanic by moving the wheel by hand onto the floorplate.

The method then includes a step of driving the wheel-holder unit 2 along the axis of rotation 201 until intercepting the rim C to lock the wheel R to the wheel-holder unit 2.

The wheel-holder unit 2, with the wheel R or the rim C locked thereto, is lifted off the floorplate 501.

The tyre mechanic selects the tool to be used. For this purpose, there are two options.

In a first option, the tyre mechanic can use the tool 8 (or the tools 8 or 8') associated with the turret 4: in this case, the tyre mechanic can proceed to moving the turret from its non-operating condition to its operating condition so as to place the tool 8 or 8' in its working position. Moving the turret 4 from its non-operating condition to its operating condition can be done, for example, by operating an actuator.

When the turret 4 is in its operating condition, at least one tool 8 or 8' mounted on the turret 4 is in its working position where it can interact with the tyre P and/or the rim C.

In the second option, the tyre mechanic can decide to use the further tool 7' connected to the tool-holder arm 6'.

The further tools not used are kept at suitable positions where they do not interfere with subsequent operations.

In this case, the tyre mechanic proceeds to fixing at least one tool-holder arm 6 or 6' to the floorplate 501 at a predetermined, stationary position (in such a way that the tool-holder arm 6 projects from the floorplate 501 transversely to the placement surface S').

The tool-holder arm 6 is fixed to the floorplate 501 by means of at least one connecting member 502.

To do this, the arm 6 or 6' is inserted and fixed in at least one hole 502*a*.

When at least one tool-holder arm 6 or 6' is fixed to the floorplate 501, at least one further tool 7 or 7' mounted on the at least one tool-holder arm 6 or 6' is in its working position where it can interact with the tyre P and/or the rim C.

Before the tool-holder arm 6 is fixed in this way, the tool-holder arm 6 is at a rest position, clear of the floorplate 501, especially the portion of the floorplate 501 in front of the wheel-holder unit 2; thus, the floorplate 501 is left clear to move the wheel onto the floorplate 501.

The method then includes a step of driving the wheel-holder unit 2, with the wheel R or the rim C locked thereto, along the axis of rotation 201 towards the further tool 7 of the tool-holder arm 6, to perform the at least one operation by joint action between the wheel-holder unit 2, which is movable, and the (further) tool 7, which is stationary.

If a tool 8 of the turret 4 is used, the next step is to move the tool-holder turret 4 relative to the wheel-holder unit 2 parallel to the axis of rotation 201 in order to allow interaction between the tyre P and the tool 8. In this case, there are several possible options for the horizontal movement: it may be imparted only to the wheel-holder unit 2 (the turret 4 remains motionless, that is, stationary), or it may be imparted only to the turret 4 (the wheel-holder unit 2 remains motionless, that is, stationary), or it may be imparted to both the turret 4 and the wheel-holder unit 2. Obviously, the rotational movement of the wheel R or rim C about its axis (performed during the operation on the tyre according to a known method) is necessarily performed by the wheel-holder unit 2.

Operatively, the (further) tool 7 mounted on the tool-holder arm 6 in its operating work position is situated at a first height relative to the floorplate 501. On the other hand, the tool 8 or 8' mounted on the turret 4 in its operating work position is situated at a second height relative to the floorplate 201. The second height is greater than the first height. Thus, in a possible method of use, the tyre mechanic can use the tool-holder arm 6 for relatively small wheels and the turret 4 for relatively large wheels.

FIG. 4 shows an operator O of average height from behind to indicate a possible large wheel size which the machine 1 can work on.

The invention claimed is:

1. An apparatus for mounting and removing a tyre, comprising:
   - a wheel-holder unit configured to lock a wheel and to set the wheel in rotation about a horizontal axis of rotation operatively at right angles to gravity, the axis of rotation being oriented in a longitudinal direction;
   - a floorplate, treadable and surmountable by the wheel and provided with a placement surface extending horizontally, parallel to the horizontal axis of rotation to receive and support the wheel resting thereon, wherein the floorplate extends along the longitudinal direction from a first edge to a second edge, wherein the wheel-holder unit is positioned on the placement surface at the second edge of the floorplate, so that the wheel locked to the wheel-holder unit is positioned above the placement surface, wherein the floorplate, in all its length between the first edge and the second edge along the longitudinal direction, has a thickness along a vertical direction, so that the floorplate has said thickness at the placement surface, the placement surface being intercepted by a vertical plane, the vertical plane including the rotation axis;
   - a ramp, providing an inclined surface having a first end and a second end opposite the first end, the first end and the second end being spaced, in the vertical direction, of a quantity that equals the thickness of the floorplate;
   - a drive system configured to move the wheel-holder unit along the horizontal axis of rotation;
   - a tool-holder turret movably connected to the floorplate and adapted to support at least one tool to keep it in an operating work position where it can interact with the tyre of the wheel;
   - at least one tool-holder arm connected to an at least one further tool;
   - a plurality of connecting members provided at the floorplate in correspondence of the placement surface, at respective predetermined fixed positions spaced from one another along a longitudinal axis orthogonal to the vertical direction, where the at least one tool-holder arm is removably fixable to the floorplate by means of the plurality of connecting members in such a way that the at least one tool-holder arm projects from the floorplate transversely to the placement surface and holds the at least one further tool in said operating work position where it can interact with the tyre;
   - wherein the plurality of connecting members is integral to the floorplate, so that the at least one further tool is capable of being connected to the floorplate at a stationary position relative to a movement of the wheel-holder unit, the stationary position being defined by the predetermined fixed positions of the plurality of connecting members to which the at least one tool-holder arm is removably fixed,
   - wherein the at least one tool-holder arm can be anchored directly to the floorplate and removed from the floorplate, so that the at least one tool-holder arm is selectively anchorable in any of the predetermined fixed positions that are fixed with respect to a supporting surface, wherein each connecting member of the plurality of connecting members comprises a hole made in the floorplate and adapted to receive the at least one tool-holder arm in a direction transverse to the placement surface, the connecting members of the plurality of connecting members being aligned along the longitudinal axis included in the vertical plane.

2. The apparatus according to claim 1, wherein the plurality of connecting members is disposed along the longitudinal axis of placement in the vertical plane, the vertical plane being parallel to the horizontal axis of rotation or aligned with the horizontal axis of rotation and being transverse to the placement surface.

3. The apparatus according to claim 2, comprising a slide on which the tool-holder turret is mounted, the slide being configured to move the tool-holder turret translationally relative to the floorplate by translation of the slide along an axis of translation, the axis of translation being situated laterally of, and spaced from, the vertical plane.

4. The apparatus according to claim 1, wherein the tool-holder turret is movable towards and away from the horizontal axis of rotation in order to move the at least one tool between the operating work position and a rest position where the at least one tool is clear of the tyre.

5. The apparatus according to claim 1, wherein the drive system is configured to move the wheel-holder unit towards and away from the floorplate.

6. The apparatus according to claim 1, wherein the at least one tool or the at least one further tool is a tool for mounting or removing the tyre or a bead breaker tool.

7. The apparatus according to claim 1, wherein a working position of the at least one further tool is situated at a first height relative to the floorplate and the working position of the at least one tool is situated at a second height relative to the floorplate, the second height being greater than the first height.

8. The apparatus according to claim 1, comprising:
a plurality of tool-holder arms adapted to support a plurality of respective further tools;
wherein the plurality of tool-holder arms are removably fixable to the floorplate by means of the respective plurality of connecting members, in such a way that the plurality of tool-holder arms project from the floorplate transversely to the placement surface and keep the plurality of respective further tools at respective working positions where they can interact with the tyre.

9. The apparatus according to claim 8, wherein the plurality of connecting members are disposed and distributed along the longitudinal axis of placement in the vertical plane, the vertical plane being parallel to the horizontal axis of rotation or aligned with the horizontal axis of rotation and being transverse to the placement surface.

10. The apparatus according to claim 1, wherein the drive system includes a hydraulic actuator, to translate the wheel-holder unit along the horizontal axis of rotation, wherein the wheel-holder unit is mounted on a first slide and the hydraulic actuator translates the first slide.

11. The apparatus according to claim 1, comprising an actuator, the actuator translating the tool-holder turret relative to the floorplate, wherein the tool-holder turret is mounted on a slide and the actuator translates the slide.

12. The apparatus according to claim 1, wherein the drive system translates the wheel-holder unit independently to movements of the tool-holder turret, so to vary a position of the wheel-holder unit along the horizontal axis of rotation relative to the floorplate, independently to a position of the tool-holder turret along the horizontal axis of rotation.

13. An apparatus for mounting and removing a tyre operatively resting on a supporting surface, comprising:
a wheel-holder unit configured to lock a wheel and to set the wheel in rotation about a horizontal axis of rotation operatively at right angles to gravity, the axis of rotation being oriented in a longitudinal direction;
a floorplate treadable and surmountable by the wheel and provided with a placement surface extending horizontally, parallel to the horizontal axis of rotation to receive and support the wheel resting thereon, wherein the floorplate extends along the longitudinal direction from a first edge to a second edge, wherein the wheel-holder unit is positioned on the placement surface at the second edge of the floorplate, so that the wheel locked to the wheel-holder unit is positioned above the placement surface, wherein the floorplate in all its length between the first edge and the second edge along the longitudinal direction, has a thickness along a vertical direction, so that the floorplate has said thickness at the placement surface, the placement surface being intercepted by a vertical plane, the vertical plane including the rotation axis;
a ramp, providing an inclined surface having a first end and a second end opposite the first end, the first and the second end being spaced, in the vertical direction, of a quantity that equals the thickness of the floorplate;
a drive system configured to move the wheel-holder unit along the horizontal axis of rotation;
a tool-holder turret movably connected to the floorplate and adapted to support at least one tool to keep it in an operating work position where it can interact with the tyre of the wheel;
at least one tool-holder arm connected to a further tool;
a plurality of connecting members situated on the placement surface of the floorplate at respective predetermined fixed positions spaced from one another along a longitudinal axis orthogonal to the vertical direction, where the at least one tool-holder arm is removably fixable to the floorplate by means of the plurality of connecting members in such a way that the at least one tool-holder arm projects from the floorplate transversely to the placement surface and holds the further tool in said operating work position where it can interact with the tyre, so that the at least one tool-holder arm can be anchored in a position that is fixed with respect to the supporting surface;
wherein the drive system translates the wheel-holder unit independently to movements of the tool-holder turret, so to vary a position of the wheel-holder unit along the horizontal axis of rotation relative to the floorplate, independently to a position of the tool-holder turret along the horizontal axis of rotation,
wherein the wheel-holder unit is mounted on a first slide and the tool-holder turret is mounted on a second slide, the drive system including a first hydraulic actuator, to translate the first slide, and a second hydraulic actuator, to translate the second slide, wherein the at least one tool-holder arm can be anchored directly to the floorplate and removed from the floorplate, so that the at least one tool-holder arm can be selectively anchored in any of the predetermined fixed positions that are fixed with respect to the supporting surface,
wherein each connecting member of the plurality of connecting members comprises a hole made in the floorplate and adapted to receive the at least one tool-holder arm in a direction transverse to the placement surface, the connecting members of the plurality of connecting members being aligned along the longitudinal axis included in the vertical plane.

14. An apparatus for mounting and removing a tyre operatively resting on a supporting surface, comprising:
a wheel-holder unit configured to lock a wheel and to set the wheel in rotation about a horizontal axis of rotation operatively at right angles to gravity the axis of rotation being oriented in a longitudinal direction;
a floorplate treadable and surmountable by the wheel and provided with a placement surface extending parallel to the horizontal axis of rotation to receive and support the wheel resting thereon, wherein the floorplate extends along the longitudinal direction from a first edge to a second edge, wherein the wheel-holder unit is positioned on the placement surface at the second edge of the floorplate, so that the wheel locked to the wheel-holder unit is positioned above the placement surface, wherein the floorplate, in all its length between the first edge and the second edge along the longitudinal direction, has a thickness along a vertical direction, so that the floorplate has said thickness at the placement surface, the placement surface being intercepted by a vertical plane, the vertical plane including the rotation axis;
a ramp, providing an inclined surface having a first end and a second end opposite the first end, the first and the second end being spaced, in the vertical direction, of a quantity that equals the thickness of the floorplate;
a drive system configured to move the wheel-holder unit along the horizontal axis of rotation;
a tool-holder turret movably connected to the floorplate in correspondence of the placement surface, and adapted to support at least one tool to keep it in an operating work position where it can interact with the tyre of the wheel;

at least one tool-holder arm connected to a further tool;

a plurality of holes provided in the floorplate at respective predetermined fixed positions spaced from one another along a longitudinal axis orthogonal to the vertical direction, said predetermined fixed positions being stationary with respect to movements of the wheel-holder unit, wherein the at least one tool-holder arm is removably fixable to the floorplate by insertion into the plurality of holes, in such a way that the at least one tool-holder arm projects from the floorplate transversely to the placement surface and holds the further tool in said operating work position where it can interact with the tyre, wherein the plurality of holes is provided in the floorplate so that the at least one tool-holder arm can be anchored directly to the floorplate and removed from the floorplate, so that the at least one tool-holder arm is anchorable in any of the predetermined fixed positions that is fixed with respect to the supporting surface, wherein each hole of the plurality of holes is aligned along the longitudinal axis which is included in the vertical plane and connecting member of a plurality of connecting members is aligned in the longitudinal direction, the first and second end of the ramp being horizontally spaced in a direction transverse to the longitudinal direction.

\* \* \* \* \*